(12) United States Patent
Granottier et al.

(10) Patent No.: US 12,188,567 B2
(45) Date of Patent: Jan. 7, 2025

(54) FLUID CIRCUIT COMPRISING THREE WAY VALVE WITH ADJUSTMENT DEVICE

(71) Applicant: VOLVO TRUCK CORPORATION, Gothenburg (SE)

(72) Inventors: Nicolas Granottier, Lyons (FR); Guillaume Malsot, Marennes (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 197 days.

(21) Appl. No.: 17/456,438

(22) Filed: Nov. 24, 2021

(65) Prior Publication Data

US 2022/0228668 A1    Jul. 21, 2022

(30) Foreign Application Priority Data

Jan. 19, 2021  (EP) .................... 21305062

(51) Int. Cl.
*F16K 11/10* (2006.01)
*F28F 27/02* (2006.01)

(52) U.S. Cl.
CPC ............ *F16K 11/105* (2013.01); *F28F 27/02* (2013.01); *F28F 2250/06* (2013.01)

(58) Field of Classification Search
CPC .... F16K 11/105; F16K 11/0716; F16K 11/07; F16K 11/072; F16K 11/078; F16K 11/161; F16K 11/18; F16K 3/06; F16K 3/262; F16K 3/265; F16K 3/32; F16K 17/04; F16K 17/06; F16K 17/065; F16K 17/08; F16K 17/082; F16K 31/1221; F16K 27/045; F28F 27/02; F28F 2250/06
See application file for complete search history.

(56) References Cited

U.S. PATENT DOCUMENTS

| | | | | |
|---|---|---|---|---|
| 3,353,590 A | * | 11/1967 | Holman | F01M 1/10 165/158 |
| 3,693,663 A | * | 9/1972 | Tolnai | F16K 11/078 137/636.4 |
| 3,985,154 A | * | 10/1976 | Hargraves | F16K 31/1225 137/625.29 |
| 2010/0243085 A1 | * | 9/2010 | Van Weelden | F16K 11/0716 137/625.48 |
| 2014/0183384 A1 | * | 7/2014 | Griffin | F16K 3/0209 251/120 |
| 2018/0231135 A1 | | 8/2018 | Matteucci et al. | |

FOREIGN PATENT DOCUMENTS

DE    102019200940 A1    7/2020

OTHER PUBLICATIONS

European Search Report dated Jul. 9, 2021 in corresponding European Patent Application No. 21305062.8, 7 pages.

* cited by examiner

*Primary Examiner* — Travis Ruby
(74) *Attorney, Agent, or Firm* — Venable LLP; Jeffri A. Kaminski

(57) ABSTRACT

A 3-way valve includes a central channel into which opens an inlet port, a first outlet port and a second outlet port. The 3-way valve has an adjustment device simultaneously ensuring the opening and the closing of the first port and the closing and the opening of the second port, so that the closing speed of the first port is faster than the opening speed of the second port.

8 Claims, 2 Drawing Sheets

FLUID CIRCUIT COMPRISING THREE WAY VALVE WITH ADJUSTMENT DEVICE

TECHNICAL FIELD

The invention concerns a fluid circuit for a motor vehicle and more particularly a fluid circuit comprising a 3-way valve. The fluid circuit according to the invention can be applied to any type of fluid, including a cooling circuit.

The invention can be applied in heavy-duty vehicles, such as trucks, buses and construction equipment.

BACKGROUND

It is known a fluid system including a 3-way valve managing the flow in a branch with a heat exchanger and a branch for the exchanger by-pass (the by-pass branch usually has a much lower pressure drop than the heat exchanger branch) such as automotive coolant thermostat or oil thermostat. In such a system, it requires that the orifice of the 3 ways valve in front of the high pressure drop branch is almost fully open (and the orifice of the 3 ways valve in front of the low pressure drop branch is almost fully closed) to get a flow in the high pressure drop branch that is significant.

In other words, it takes a long stroke of the valve piston to starts to reduce significantly the flow in the low-pressure drop branch/increase significantly the flow in the high-pressure drop branch. Therefore, regulation of the flow in the 2 branches is only done along a small part of the piston stroke, which can make a control very difficult.

In view to reduce this drawback it is known solution to increase permanently the pressure drop of the so-called "low pressure drop branch" which ends in an overall increase of the complete system pressure drop, whatever the position of the piston valve (fully close, fully open, or any position in-between). This has a negative impact on the pump, which then absorb power and so increase the fuel consumption

SUMMARY

An object of the invention is to provide a fluid circuit managing drop pressure difference between two ducts connected to a three-way valve without increasing fuel consumption.

This is achieved by a fluid circuit comprising a 3-way valve, the 3-way valve comprises a central channel into which an inlet port, a first outlet port and a second outlet port open, the 3-way valve comprises an adjustment device which simultaneously opens, respectively closes the first port and closes respectively opens so that the closing speed of the first port is faster than the opening speed of the second port.

The difference in opening/closing of the two ports allows having a progressive pressure drop of the system along the stroke of the valve. If only a simple valve was used, the pressure drop would suddenly change when the low-pressure drop channel will open and a high flow will suddenly raise in this low-pressure drop channel. The other drawback of the simple valve solution lead to a low flow in the partially opened high-pressure drop channel and then, a sudden flow increase when the low-pressure drop channel will close. The behavior of such a simple valve is then hard to control, because the flows are inverting very quickly in a very small range of stroke of the valve.

According to another embodiment, the adjustment device comprises a first piston mounted coaxially in the central channel, the piston comprises a first window and a second window, the first respectively second window being arranged to ensure the opening of the first respectively second orifice, the first window being equipped in a flap actuated by the movement of the first piston and ensuring the at least partial closing of the first orifice of the 3-way valve.

According to another embodiment, the adjustment device comprises a first piston mounted coaxially in the central channel, the first piston comprises a first window and a second window, the first respectively second window being arranged so as to ensure the opening of the first respectively second orifice, the opening device comprises a second piston mounted coaxially in the first piston the second piston comprises a first window and a second window, the first window being arranged so as to partially close the first window of the first piston when the first orifice is closed by the first piston.

In another embodiment, the first piston is slidably mounted in the central channel and comprises an elastic element for returning it to a position closing the second orifice.

Alternatively, the second piston is slidably mounted in the first piston and has an elastic return element to return it to a position where the first window of the first piston is partially closed.

According to another embodiment, an actuator arranged to cause the first piston to move between a first position in which the first port is closed and the second port is open and a second position in which the first port is open and the second port is closed.

According to another embodiment, the fluid circuit is a cooling circuit comprising a first component connected to the first outlet port and a second component connected to the second outlet port, the pressure drop generated by the first component in the 3-way valve is lower than the pressure drop generated by the second component in the 3-way valve.

According to another embodiment, the fluid circuit is a cooling circuit comprising a heat exchanger and a heat exchanger bypass circuit, the first outlet port being connected to the heat exchanger bypass circuit and the second outlet port being connected to the heat exchanger In case of a cooling system, the cooler being the high pressure drop channel and the by-pass the low pressure drop channel, the actuator might be a thermostat. For a wax thermostat, the invention will enable the highest regulated temperature. For an electrical thermostat, the controller will be easy to define, and its associated data set will ensure an accurate position of the valve.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1A:
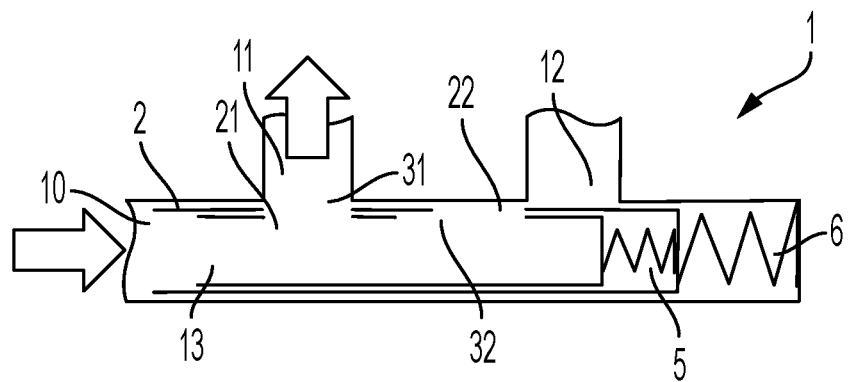
FIG. 1A, 1B, 1C shows a schematic view of a first embodiment of a 3-way valve of the fluid circuit according to the invention in three different operating positions.

The present invention will be described with reference to FIGS. 1A, 1B, 1C, 2A, 2B, 2C. The invention relates to a fluid circuit comprising a three-way valve 1. The three-way valve 1 comprises a central channel 13, an inlet port 10, constituting the first path, a first 11 and a second 12 outlet ports constituting the second and third paths. According to the invention, the first port 11 is arranged between the inlet port 10 and the second port 12 in the direction of flow of the fluid in the three-way valve. In a manner known per se, the first outlet orifice 11 is connected to a first component (not shown) of the fluid circuit and the second orifice 12 is connected to a second component (not shown) of the fluid circuit. According to the invention, the first component generates a pressure drop at the level of the first port 11, which is lower than the pressure drop generated by the second component in the second port 12. By way of example, the fluid circuit according to FIG. invention is a cooling circuit. The second port 12 of the three-way valve is to a heat exchanger and the first port 11 is connected to a branch bypassing the heat exchanger.

The three-way valve 1 comprises an adjustment device 2, 3, 4 the opening/closing of the first/second orifices 11, 12. According to the invention, the adjustment device 2, 3 4 simultaneously ensures the closing of the first orifice 11 and the opening of the second orifice 12 and vice versa. In other words, when the adjustment device 2, 3, 4 is in a closed position of the first port 11, the adjustment device 2, 3, 4 is in an open position of the second port 12 and conversely.

In order to compensate for the difference in pressure drop generated in the first and second ports 11, 12 of the three-way valve 1, the adjustment device 2, 3, 4 comprises a closure element for the first port ensuring faster closing of the first port 11 relative to the opening speed of the second port 12. In other words, when the first port 11 is closed and the second port 12 is opened simultaneously, the passage section of the first port 11 will decrease more rapidly than the increase in the passage section of the second orifice 12.

Figure 1B:
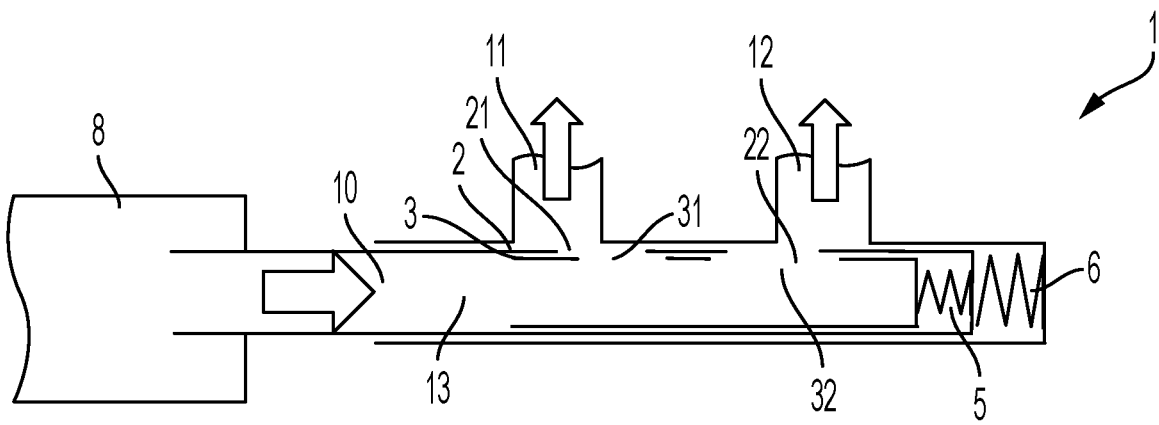
Figure 1C:
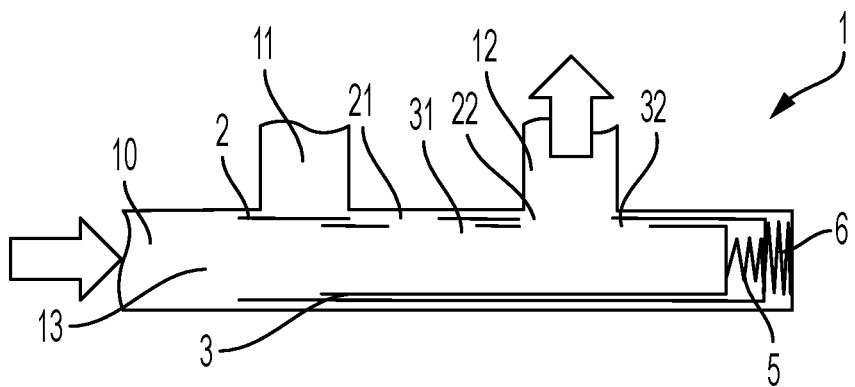

According to a first variant embodiment shown in FIGS. 1A, 1B, 1C, the adjustment device comprises a first piston 2 mounted in the channel 13 of the three-way valve 1. The first piston 2 is hollow open at a first end and closed at the second end. The first end is located at the inlet of the three-way valve 1.

The first piston 2 comprises a first window 21 and a second window 22. The first window 21 is provided to come opposite the first orifice 11 when the three-way valve 1 is in the open position of the first orifice and the second window 22 is designed to come opposite the second orifice 12 when the three-way valve 1 is in the open position of the second orifice 12. In operation, the fluid circulates in the first piston 2 then through of the first and/or second window 21, 22 depending on the position of the first piston 2 in the channel 13.

According to the first variant, the first piston 2 is slidably mounted in the channel 13 of the three-way valve 1. The translational movement of the first piston 2 is provided by an actuator 8 known per se of the solenoid type. A first elastic element 6 is mounted between the first piston 2 and the channel 13 to return the first piston to an initial position where the first window 21 is opposite the first orifice 11 and the second orifice 12 is closed. Thus, when the actuator 8 is actuated, the first piston 2 is moved to a position where the second window 22 is opposite the second port 12 and the first port 11 is closed. When the actuator 8 is deactivated, the first elastic element 6 returns the piston to the initial position The adjustment device further comprises a second piston 3 mounted in the first piston 2. The second piston 3 is hollow open at a first end and closed at the second end. The first end is located at the inlet of the three-way valve 1.

The second piston 3 comprises a first window 31 and a second window 32. The first window 31 is provided to come opposite the first orifice 11 when the three-way valve 1 is in the open position of the first orifice and the second window 32 is provided to come opposite the second orifice 12 when the three-way valve 1 is in the open position of the second orifice 12. In operation, the fluid circulates in the second piston 3 then through of the first and/or second window 31, 32 depending on the position of the first piston 2 in the channel 13. According to the invention, the dimensions of the first window 31 of the second piston 3 are substantially the same as the first window 21 of the first piston 2. The dimensions of the second window 32 of the second piston 3 are larger than the dimensions of the second window 22 of the first piston 2. Furthermore, a second elastic means 5 is mounted between the first and the second piston 2, 3 to return the second piston to an initial position where the first window 31 of the second piston is facing the first orifice 11 and the second port 12 is closed. The elasticity of the second elastic element 5 is provided so that the second piston 3 moves faster than the first piston 2 when the first port 11 is closed. Thus, the passage section of the first port 11 of the three-way valve closes faster than the second port 12 of the three-way valve opens. This difference in passage section then makes it possible to compensate for the difference in pressure drop between the first 11 and the second 12 orifices generated during the circulation of the fluid. Indeed, the pressure drop generated in the first orifice 11 is lower than that generated in the second orifice 12. The smaller passage section of the first orifice 11 will allow a flow of fluid in the second origin 12 in which is generated greater pressure drop.

FIG. 1A illustrates the initial position of the three-way valve 1 according to the invention in which the first port 11 is open and the second port 12 is closed. In this position, the first windows 21, 31 of the first and second piston 2, 3 are facing the first orifice 11. The first windows 21, 31 of the first and second piston 2, 3 are aligned. The second windows 22, 32 of the first and second piston 2, 3 are offset from the second orifice 12.

FIG. 1B represents an intermediate position of the three-way valve 1 in which the actuator has started to move the first piston 2 towards the open position of the second port 12. In this intermediate position, the first window 21 of the first piston 2 shifts and the first piston partially closes the first orifice 11. The second window 22 of the first piston 2 begins to align with the second orifice 12, then increasing the passage section of the second orifice 12. At the same time, the second piston 3 obstructs part of the first window 21 of the first piston 2, then reducing the passage section of the first orifice 11 relative to the passage section of the second orifice 12.

FIG. 1C illustrates the final position of the three-way valve 1 according to the invention in which the first port 11 is closed and the second port 12 is open. In this position, the second windows 22, 32 of the first and second piston 2, 3 are opposite the second orifice 12. The second windows 22, 32 of the first and second piston 2, 3 are opposite screw from to the second port 12. The second windows 22, 32 of the first and second piston 2, 3 are aligned.

Sealing elements (not shown) (of the seal or lip type) are positioned between the channel 13 and the first piston 2 and between the first piston 2 and the second piston 3 in order to prevent fluid leaks. The first and second elastic means are coil springs.

Figure 2A:
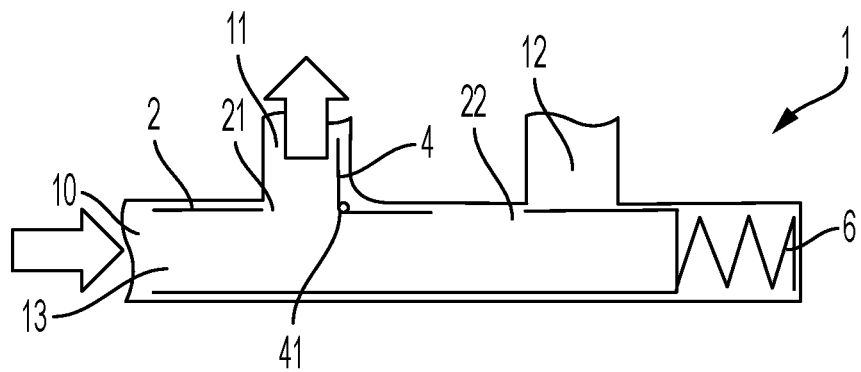
FIG. 2A, 2B, 2C shows a schematic view of a second embodiment of a 3-way valve of the fluid circuit according to the invention in three different operating positions.
Figure 2B:
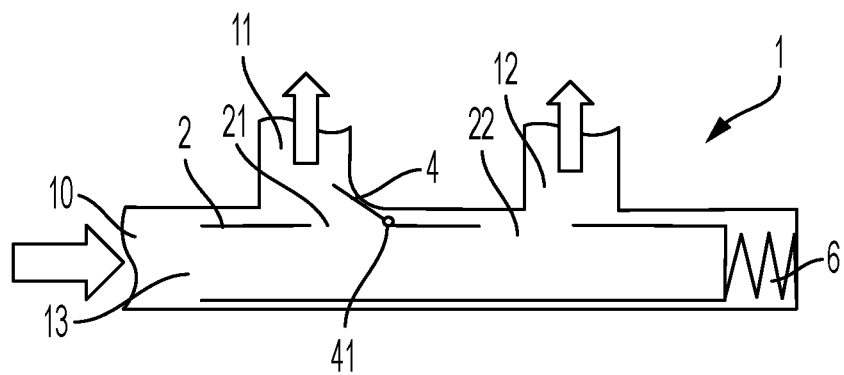
Figure 2C:
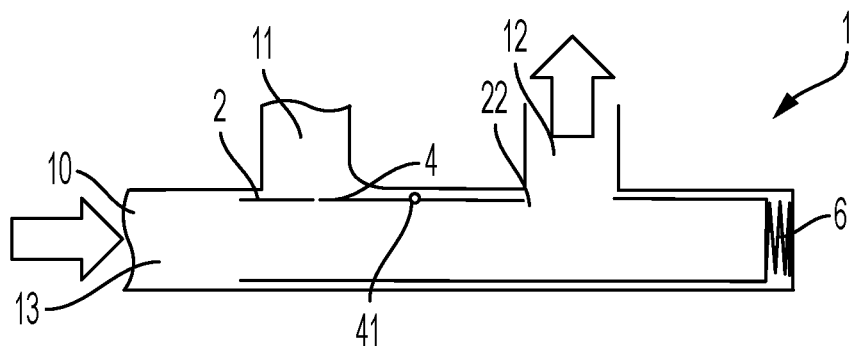

According to a second variant embodiment shown in FIGS. 2A, 2B, 3B, the second piston 2 is replaced by a shutter 4. The shutter 4 is pivotally mounted on the edge of the first window 21 of the first piston 2. The shutter 4 is arranged to open or close the first window 21 of the first piston 2 during the movement of the first piston. The dimensions of the shutter 4 correspond to the dimensions of the first window 21 of the first piston 2. The pivoting of the shutter 4 is for example provided by a hinge 41 positioned on the edge of the first window 11 furthest from the inlet orifice 10 of the three-way valve 1.

FIG. 2A illustrates the initial position of the three-way valve 1 according to the invention in which the first port 11 is open and the second port 12 is closed. In this opening position of the first window 21, the shutter 4 enters the first orifice 11. The shutter 4 does not interfere with the flow of fluid in the first orifice 11. The second orifice 12 being closed by the first piston 1, the entire fluid flow passes through the first orifice 11.

FIG. 2B represents an intermediate position of the three-way valve 1 in which the actuator has started to move the first piston 2 towards the open position of the second port 12. When moving the first piston 2 in the opening direction from the second orifice 12, the shutter 4 is moved by the wall of the first orifice 11 to partially obstruct the first window 11 of the first piston. The junction between the wall of the orifice and the channel 13 of the three-way valve 1 may have a radius of curvature to ensure progressive pivoting of the shutter 4. The second window 22 of the first piston 2 begins to align with the second orifice 12 then increasing the passage section of the second orifice 12. However, in this position, the passage section of the first window 21 is reduced by the shutter 4 relative to the passage section of the second window 22. This difference in passage section in favor of the second window 22 makes it possible to balance the flow of fluid between the two orifices 11, 12 without modifying the flow entering the three-way valve 1.

FIG. 1C illustrates the final position of the three-way valve 1 according to the invention in which the first port 11 is closed and the second port 12 is open. In this position, the shutter 4 is held in the closed position of the first window 21 by the wall of the channel 13. The second window 22 of the first piston 2 faces the second orifice 12. In this position, the entire flow passes through the second port 12.

According to an alternative embodiment not shown, an assembly is rotation of the first piston 2 and/or of the second piston 3 is also possible.

It is to be understood that the present invention is not limited to the embodiments described above and illustrated in the drawings; rather, the skilled person will recognize that many changes and modifications may be made within the scope of the appended claims.

The invention claimed is:

1. A fluid circuit comprising a 3-way valve, the 3-way valve comprises a central channel into which opens an inlet port, a first outlet port and a second outlet port, the 3-way valve comprises an adjustment device, wherein the adjustment device comprises a first piston mounted coaxially in the central channel, the first piston comprises a first window and a second window, wherein the first window is arranged to move away from a first orifice when the 3-way valve is in an open position for the first orifice, wherein the second window is arranged to move away from a second orifice when the 3-way valve is in an open position for the second orifice, and wherein a shutter is mounted on the edge of the first window, the shutter being actuated by movement of the first piston and ensuring at least partial closure of the first orifice of the 3-way valve, ensuring that the first outlet port opens when simultaneously the second outlet port closes and the first outlet port closes when simultaneously the second outlet port opens in a manner that the closing speed of the first outlet port is faster than the opening speed of the second outlet port.

2. The fluid circuit according to claim 1 wherein the first piston is slidably mounted in the central channel and returns to an initial position at least in part due to an elastic element.

3. The fluid circuit according to claim 1 wherein the 3-way valve comprises an actuator arranged to cause the movement of the first piston between a first position in which the first outlet port is closed and the second outlet port is open and a second position in which the first outlet port is open and the second outlet port is closed.

4. The fluid circuit according to claim 1 wherein the fluid circuit is a cooling circuit comprising a first component connected to the first outlet port and a second component connected to the second outlet port, the pressure drop generated by the first component in the 3-way valve is lower than the pressure drop generated by the second component in the 3-way valve.

5. The fluid circuit according to claim 1, wherein the fluid circuit is a cooling circuit comprising a heat exchanger and a bypass circuit of the heat exchanger, the first outlet port being connected to the heat exchanger bypass circuit and the second outlet port being connected to the heat exchanger.

6. A fluid circuit comprising a 3-way valve, the 3-way valve comprises a central channel into which opens an inlet port, a first outlet port and a second outlet port, the 3-way valve comprises an adjustment device ensuring that the first outlet port opens when simultaneously the second outlet port closes and the first outlet port closes when simultaneously the second outlet port opens in a manner that the closing speed of the first outlet port is faster than the opening speed of the second outlet port, wherein the 3-way valve comprises an actuator arranged to cause the movement of a first piston between a first position in which the first outlet port is closed and the second outlet port is open and a second position in which the first outlet port is open and the second outlet port is closed.

7. The fluid circuit according to claim 6 wherein the adjustment device comprises a first piston mounted coaxially in the central channel, the first piston comprises a first window and a second window, the first respectively second window being arranged so as to ensure the opening of the first respectively second orifice, the opening device comprises a second piston mounted so coaxial in the first piston the second piston comprises a first window and a second window, the first window of the second piston being arranged so as to partially close the first window of the first piston when the first orifice is closed by the first piston.

8. The fluid circuit according to claim 6 wherein the second piston is slidably mounted in the first piston and comprises an elastic element for returning to a position partially closed off the first window of the first piston.

* * * * *